United States Patent [19]

Pugaczewski

[11] Patent Number: 5,729,368
[45] Date of Patent: Mar. 17, 1998

[54] METHOD OF PROVIDING NON-INTRUSIVE OPTICAL TEST ACCESS WITHOUT OPTICAL LOSS

[75] Inventor: John T. Pugaczewski, White Bear Lake, Minn.

[73] Assignee: U S West, Inc., Englewood, Colo.

[21] Appl. No.: 648,465

[22] Filed: May 15, 1996

[51] Int. Cl.$^6$ .................................................. H04B 10/08
[52] U.S. Cl. ........................................ 359/110; 356/73.1
[58] Field of Search ................................. 359/110, 115, 359/127, 143, 161, 173; 356/73.1

[56] References Cited

U.S. PATENT DOCUMENTS

| | | | |
|---|---|---|---|
| 5,218,465 | 6/1993 | Lebby et al. | 359/110 |
| 5,552,881 | 9/1996 | Jezwinski et al. | 356/73.1 |

FOREIGN PATENT DOCUMENTS

| | | | |
|---|---|---|---|
| 2011710 | 7/1992 | WIPO | 359/110 |

Primary Examiner—Kinfe-Michael Negash
Attorney, Agent, or Firm—Brooks & Kushman

[57] ABSTRACT

A non-intrusive test method for monitoring the performance of an optical communications system generates a parallel electrical signal corresponding to a transmitted or received optical signal without the use of a signal attenuating beam splitter or other device having optical loss by deriving the parallel electrical signal from a modulated electrical signal associated with the generation or detection of the optical signal, or from stray light generated by the optical light source. An ATM module containing a plurality of transmit and receive cables connects selected parallel electrical signals corresponding to selected optical cables to a limited number of test jacks employing a multiplexer which may be computer controlled. The non-intrusive test method allows maximal optical cable range.

12 Claims, 1 Drawing Sheet

METHOD OF PROVIDING NON-INTRUSIVE OPTICAL TEST ACCESS WITHOUT OPTICAL LOSS

TECHNICAL FIELD

The present invention pertains to optical fiber communications. More particularly, the present invention pertains to a method of testing signals in an optical fiber communications network without optical loss.

BACKGROUND ART

Communications systems employing fiber optics as the transmission medium are now common. The fibers used in such systems employ a glass fiber core having a relatively high refractive index and a cladding of a glass having a lower refractive index such that total reflection occurs between the cladding and the core. Light of a given frequency is applied to the fiber optic at a specified angle of acceptance and is propagated by multiple reflections through the core. Digital information is represented by on and off conditions of the light source providing the optical signal.

The variation in path length of the multiply reflected light causes the square wave envelope representing the on/off condition to be increasingly smoothed out or distorted, as the path length of the signal increases, ultimately resembling a Gaussian distribution of intensity. The maximum amplitude of the signal decreases as well, hence the ability to detect the applied signal without error limits the length of the optical fiber which may be used without conditioning and retransmitting the signal, using a "repeater" for this purpose.

Further distortion is caused by chromatic effects, due to the difference in the speed of propagation of light of different wavelengths. As light sources suitable for use in fiber optic transmission systems are generally not truly monochromatic, a spreading of the signal will occur, the degree of which again is proportional to distance between repeaters or between the source and termination. Additional signal distortions are caused by cable splices, by nicks or imperfections in the core or cladding of the cable, and by the bending of the cable over tight radii.

Improvements in the length of cable which can be tolerated without signal conditioning have been brought about by several means. Use of multi-mode graded index cores force rays to travel in curved paths, the more sharply curved paths of higher order primarily in low refractive index glass towards the exterior of the core where light travels faster, thus partially equalizing path length differences due to multiple reflections. Single mode stepped index fibers with very narrow cores have improved signal attenuation also, and currently provide the longest practical fiber optic transmission length.

However, the competitiveness of the telecommunications industry requires that the maximum length of fiber optic cable possible be used. Repeaters, particularly those used with laser diode sources which must be operated in carefully restricted humidity and temperature controlled environments, are very expensive, and the fewer used, the less expensive the telecommunications link. However, the use of long cables increases the error rate due to increased signal distortion. In general, fiber optic cables, properly installed, have a bit error rate of c.a. $10^{-9}$, while public switched networks are generally about $10^{-5}$ and private, conditioned lines, $10^{-6}$.

In order to maintain the high data transmission rates, often in excess of 1.7 Gb/s, and low error rates, the transmission lines must be tested to assure that the signal and error rates are acceptable and to identify problem lines and equipment. The fiber optic cables cannot be "unplugged" and a testing device inserted in the like, as may be the case with metal cables relying on electrical conductivity, as the fibers carrying the optical signal must be fused together by relatively expensive connecting equipment. Thus, in-line testing has been facilitated by the purposeful and permanent introduction of optical beam splitters into the transmission line. Such beam splitters split the incoming or outgoing fiber optic signal into a transmitted signal which proceeds along the fiber optic transmission path, and a split signal which may be monitored by test equipment. Beam splitters are designed to proportion the signal between the transmitted and split signals. Ratios of 90/10 (transmission/split) are common. However, the loss of even as little as 10% of the signal can increase transmission costs dramatically.

For example, a single mode fiber transmission line having repeater stations spaced maximally apart (c.a. 60 km), and extending for a distance of 1000 km, will require approximately 15 repeaters. A transmission line having but one signal splitter at a 90/10 ratio would, for the same length of line, require an additional two repeating stations, which at a cost of approximately $200,000 each, add almost half a million dollars additional cost to the line, exclusive of additional maintenance. Thus, it would be desirable to eliminate the signal loss attributed to such test methods. A non-intrusive monitoring method allows a tester to insert test equipment without taking the customer out of service.

SUMMARY OF THE INVENTION

The subject invention pertains to a non-intrusive method of testing fiber optic communications equipment. This non-intrusive test method involves creating a parallel electrical signal corresponding to the optical signal at the optical signal source or the optical signal terminus. The electrical signal may be routed to a suitable protocol analyzer, bit error rate tester, or other testing device by conventional high frequency signal wiring. The test jacks may be multiplexed with more than one set of optical sources or termini. Due to the lack of optical loss, maximum fiber optic cable range may be utilized. By creating a parallel electrical signal, it is possible to monitor all OSI layers (i.e. Physical—SONET).

DESCRIPTION OF THE PREFERRED EMBODIMENTS

Current fiber optic transmission is based on modulation of laser diodes (LD) and light emitting diodes (LED), the latter of both the surface emission and edge emission type. Laser diodes are preferred for long distance communication lines due to their higher power output and superior signal characteristics. However, such devices are more expensive and have more limited lifespans than LED devices unless maintained in climate controlled housings. All devices share the characteristic that their light output is proportional to current input. Thus, electronic modulation of input current from a low level to a high level will cause the light output to shift from low to high corresponding to digital transmission of a binary 0 or 1, respectively.

The maximum light output of a given laser diode or LED is fixed by its physical and electrical characteristics at manufacture, and thus its output may not simply be increased to mitigate loss of optical power. Such devices typically already operate at the maximum level associated with acceptable lifetime. However, the electrical signal may be increased or decreased at will, and may thus be tapped to provide an electrical signal whose current flow or voltage, whichever is desired to be monitored, provides a signal which is electrically modulated to the same extent as the modulation of the optical signal. Methods of deriving the electrical test signal from the electrical modulation input to the LD or LED are within the level of skill in the art. The signal provided, for example, may be the direct voltage analog of the optical signal, with low voltage (or negative voltage) signifying a low optical emissive state and a high voltage signifying a high optical emissive state, or may be a reverse analog with low relative voltage corresponding to a high optical emission and high relative voltage corresponding to a low optical emission. The important criterion is that the electrical test output follow the optical signal output in a predictable manner enabling testing to be performed.

In place of providing an electrical signal derived from the electronic modulation of the LD or LED, when surface emission or edge emitting LED's are utilized, the stray emissions from these devices which cannot be coupled to the fiber optic transmission cable may be used to provide an optical source which can then be converted into the requisite electrical signal by a receiver, including a detector and amplifiers and conditioners as needed. It must be understood that this method does not result in a loss of optical power as is the case with a beam splitter, as the optical signal being utilized is not one which can be coupled to the transmission line.

Figure 1:
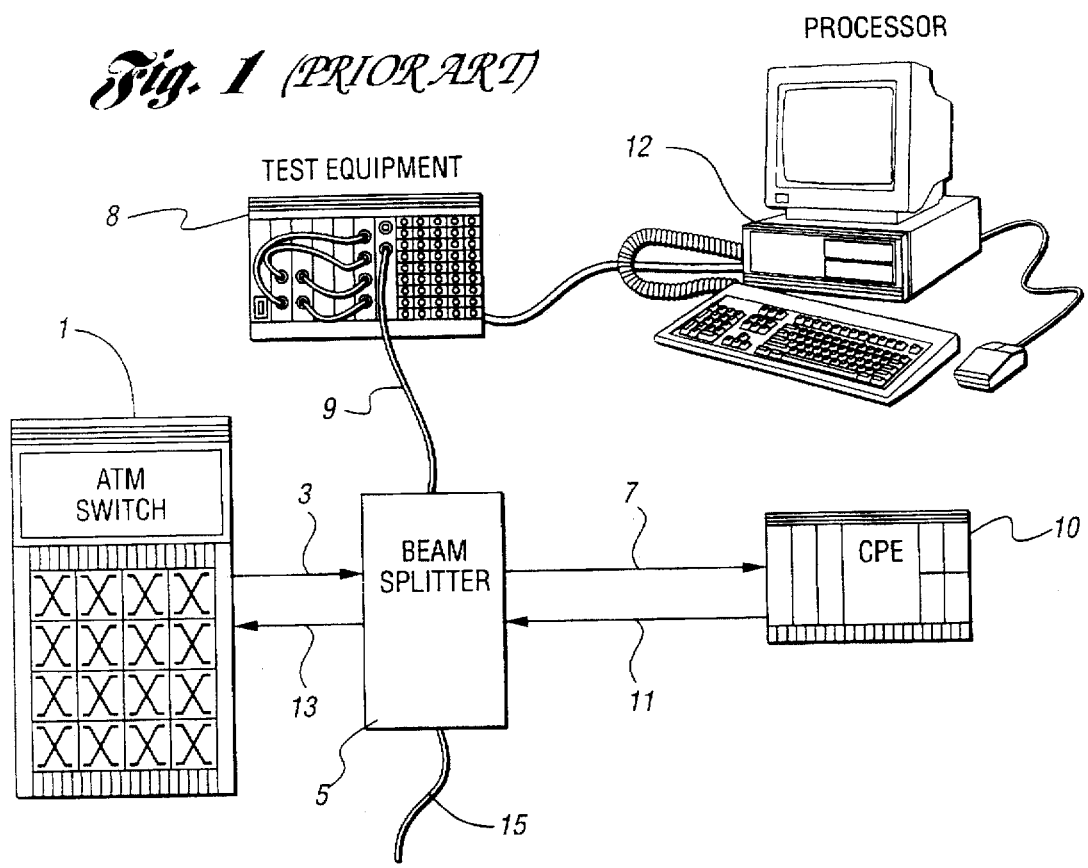
FIG. 1 illustrates the prior art test methodology utilizing an optical beam splitter to provide the test signal.

With reference to FIG. 1, the conventional testing methodology is illustrated. In FIG. 1, at 1 is the ATM (Asynchronous Transfer Mode) switch module which provides the optical signal according to the particular communications protocol, i.e. SONET. ATM is a high bandwidth, low-delay packet-based switching and multiplexing technology designed to be supported by any digital transmission hierarchy, including DS0, DS1 and DS3 (DS=Digital Signal) and SONET OC-3C, OC-12C. SONET is the U.S. acronym for a worldwide standard for optical communication, known as Synchronous Digital Hierarchy (SDH) elsewhere. The modulated optical signal is transmitted through fiber optic line 3 to beam splitter 5. The optical signal is split by the beam splitter 5 into a transmitted component which travels through fiber optic line 7 to the customer premises equipment 10 (CPE), or to the next repeater station. The split portion of the optical signal is routed through fiber optic cable 9 to the test equipment 8, for example SONET/ATM test equipment or a BERT (Bit Error Rate Tester), optionally coupled to a processor 12 for data analysis. Fiber optic lines 11 and 13 carry return signals from the CPE or repeater to the ATM switch, the optical signal passing through beam splitter 5 and providing an optical test signal through fiber optic line 15, which may also be connected to the test equipment. Rather than couple the split optical signals derived from the beam splitter to the test equipment, the split optical signals may be converted to appropriate electrical signals and routed to the test equipment. Whichever method is used, the optical transmission stream flowing through fiber optic channel 7 and the optical receive stream flowing through fiber optic channel 13 are attenuated due to the action of the beam splitter and its inherent optical loss.

Figure 2:
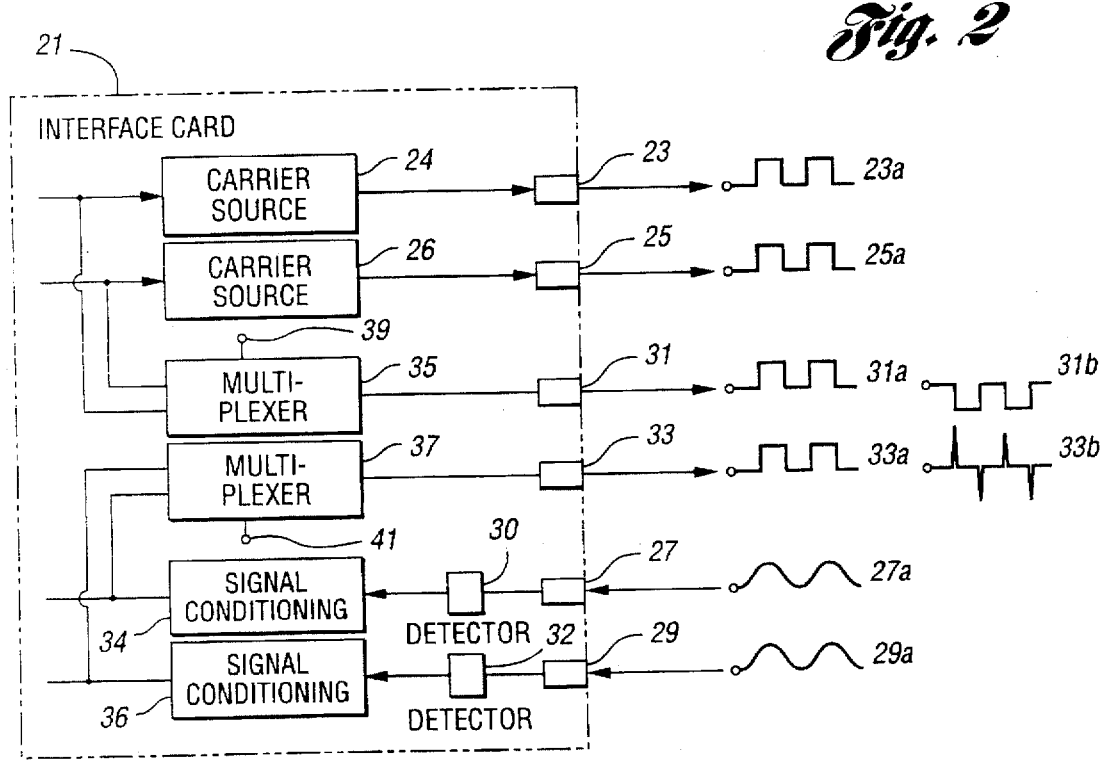
FIG. 2 illustrates a schematic of the present invention whereby one or more test ports are provided with parallel electrical signals corresponding to the optical signal without loss of the latter in both the transmit and receive signal direction.

FIG. 2 illustrates the method of the subject invention. ATM interface card 21 receives fiber optic cables 23, 25, 27, and 29 and contains electrical test jacks 31 and 33. Use of multi-mode fiber or unshielded twisted pair transmitters is possible. Fiber optic cables 23 and 25 are output lines with associated optical wave forms 23a and 25a where the waveforms are essentially undistorted "square waves" due to the optical signal having just been produced by an LD or LED from the carrier sources 24 and 26, respectively. At electrical or optical output test port 31 is an electrical or optical signal 31a which corresponds to the optical signal of cable 23 or 25, depending upon which signal is selected by multiplexer 35 from the driving electrical signal input to carrier source 24 or 26.

The input signal from fiber optic cables 27 and 29 are shown at 27a and 29a. The lack of a square wave signal is due to the distortion of the optical signal due to the signal having travelled to the ATM module from the CPE or from the last repeater in the optical transmission line along a significant length of cable. From optical cable inputs 27 and 29, the signal is transmitted to detectors 30 and 32 and signal conditioners 34 and 36, respectively. The conditioned received signals are again in square wave (or other shape as determined by the communications protocol and definitions), and applied to multiplexer 37. The particular line sampled by multiplexer 35 or 37 may be selected by multiplexer inputs 39 and 41, which, for example, may be controlled by simple manual switches or by computer. It should be noted that rather than derive the electrical signal following the signal conditioner, the signal may be derived from other points, for example, from the output of detectors 30 or 32. If derived from the detector output, an electrical signal corresponding to the optical signal as received, or an amplified version thereof, reflecting the distortion of the transmission line, will be produced. Display of the signal on an oscilloscope, for example, may reveal signal envelopes characteristic of certain patterns of distortion the cause of which may then be identified and corrected.

The electrical signals provided herein should parallel the optical signal. By "parallel" is meant a signal which corresponds in a logical manner to the optical signal envelope. As stated previously, the electrical signal may be an exact analog in the sense that it or an amplified version of the signal exhibits a one to one correspondence with conditioned or unconditioned optical signals. An example of such one to one correspondence is given in FIG. 2 at 25a and 31a, where the electrical signal intensity (voltage) of the 31a waveform exactly mirrors the optical intensity of the 25a waveform optical intensity. A further example is given by the waveforms of the unconditioned optical input waveform of 27a and the electrical analog of a conditioned waveform, 33a. In both these cases, maximum voltage of the electrical signal corresponds to maximum optical intensity.

However, the electrical signal may be the reverse, with an electrical minimum corresponding to the optical signal maximum. Such a signal is shown at 31b. In such a case, the logic of the particular analyzer will be the negative of the logic discussed previously, or an inverter may be used between the test equipment and parallel electrical signal source. Other "parallel" signals are also possible. For example, the differential of the optical signal might be used. For a square wave envelope, for example, the differential will consist of a positive spike at the leading edge of the envelope followed by a negative spike at the trailing edge, as illustrated by waveform 33b. In this case, the analyzer will recognize a positive spike followed by a negative spike as a "one" condition. Other "parallel" electrical signals are also feasible. It is only necessary, that whatever the form of the "parallel" signal, that it be capable of being decoded into a logical representation of the optical signal.

By the term "multiplexer" is meant an electronic or manual switch capable of applying more than one parallel electrical signal to a single electrical test port or jack, the parallel signals derived from the signals of different optical cables. The multiplexer may in general be a time multiplexer, applying only one signal at any given time to the test jack or port, or other multiplexing schemes may be used.

The particular signal applied by the multiplexer may be selected by appropriate manual switches, e.g. a digital "dip" switch, or the signal may be selected by controlling a logic gate by a computer. For example, a quad "and" logic gate with one of each pair of "and" inputs set high or low by a microprocessor and the other "and" input derived from one of four optical cables will enable the signal from any one cable to be applied to the test jack by holding the processor controlled input corresponding to that cable high while holding the other three processor controlled inputs low. A separate electrical connection from the processor for each optical fiber or cable is feasible as in generally only a relatively small number of cables are connected with a given ATM switch module. Of course, it is feasible to obtain the same results using an addressable programmable logic array or similar device to determine which fiber optic cable signal will be applied to the electric test jack or port.

While the best mode for carrying out the invention has been described in detail, those familiar with the art to which this invention relates will recognize various alternative designs and embodiments for practicing the invention as defined by the following claims.

What is claimed is:

1. A method for the non-intrusive testing of an optical communications signal without incurring optical loss, said method comprising:

a) selecting an optical cable whose signal is desired of testing, said optical cable transmitting a first optical signal;

b) identifying a signal source associated with said first optical signal, said signal source useful for generating a parallel electrical signal corresponding to said first optical signal, said signal source one which does not diminish the intensity of said first optical signal;

c) generating from said signal source a parallel electrical or parallel optical signal; and d) directing said parallel electrical signal or said parallel optical signal to test equipment designed to receive same.

2. The method of claim 1 wherein said first optical signal is a transmit signal derived from electrical modulation of an electrically modulatable light source.

3. The method of claim 2 wherein said signal source is an electrical source used to modulate said modulatable light source.

4. The method of claim 3 wherein said electrical source is an electric current which modulates the intensity of said light source.

5. The method of claim 1 wherein said light source is a surface emitting LED or edge emitting LED and said signal source is a stray light emission not coupled to said optical cable.

6. The method of claim 1 wherein said first optical signal is a receive signal coupled to a detector.

7. The method of claim 6 wherein said signal source is an electrical signal which is derived from the output of said detector.

8. The method of claim 6 wherein said detector generates a receive electrical or optical signal corresponding to said receive signal and said receive electrical or optical signal is further conditioned to provide a conditioned receive electrical or optical signal, said signal source comprising said conditioned receive electrical or optical signal.

9. The method of claim 1 wherein a plurality of optical cables is desired to be tested, said method further comprising:

supplying at least one test jack;

selecting a first optical cable whose signal is to be tested;

applying a first parallel electrical signal corresponding to an optical signal from said first optical cable to said test jack;

selecting a further optical cable whose signal is desired to be tested;

discontinuing applying said first parallel electrical signal to said test jack; and applying a further parallel electrical signal corresponding to an optical signal from said further optical cable to said test jack.

10. The method of claim 9 wherein each of at least one said test jack(s) is capable of receiving first and further parallel electrical signals, a particular parallel electrical signal from among said first and further parallel electrical signals applied to said test jack(s) selected by a multiplexer circuit.

11. The method of claim 10 wherein the parallel electrical signal provided by said multiplexer is selectable by computer generated input to said multiplexer.

12. The method of claim 10 wherein said multiplexer comprises a plurality of logic gates, each of said logic gates having two inputs and an output, said output connected to a test jack, one of said inputs being a parallel electric test signal, a second input being an electrical signal corresponding to a logic 0 state or a logic 1 state, such that the logic state of said second input controls the output of said gate, whereby any one or more of said plurality of logic gates may be selectively connected to said test jack by selecting the logic state of each gate desired to be connected to said test jack.

* * * * *